United States Patent Office 3,823,164
Patented July 9, 1974

3,823,164
5,6,7,8-TETRAHYDRO-2,5(AND 4,5)-DIOXO-1-BENZOPYRANS
John H. Sellstedt, King of Prussia, Stanley C. Bell, Penn Valley, and Ronald J. McCaully, Malvern, Pa., assignors to American Home Products Corporation, New York, N.Y.
No Drawing. Original application Aug. 26, 1971, Ser. No. 175,409, now Patent No. 3,775,435. Divided and this application Dec. 14, 1972, Ser. No. 315,247
Int. Cl. C07d 7/26
U.S. Cl. 260—343.2 R   6 Claims

ABSTRACT OF THE DISCLOSURE

Compounds of the formula:

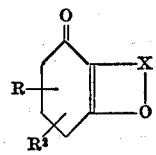

in which
X is the moiety

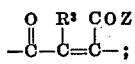

Z is a member selected from the group consisting of

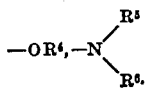

—Cl, —Br, and —OM;
R, $R^2$, $R^3$, $R^4$ and $R^5$ are independently selected from the group consisting of —H, lower alkyl, phenyl and benzyl,
$R^6$ is selected from the group consisting of —H, lower alkyl, phenyl, benzyl, lower dialkylaminoalkyl and cycloalkyl of 3 to 10 carbon atoms, and when taken with $R^5$ and the nitrogen atom to which they are bonded forms the morpholino, piperidino and piperazino groups, and
M is selected from alkali metal cations and —$NH_4$, are immuno-inflammatory agents possessing antiallergic and antiinflammatory activity. The compounds of this invention are also intermediates for the synthesis of known chromone and coumarin derivatives.

RELATED APPLICATIONS

This application is a division of Ser. No. 175,409, filed Aug. 26, 1971, by John H. Sellstedt, Stanley C. Bell and Ronald J. McCaully, now U.S. Pat. 3,775,435.

BACKGROUND OF THE INVENTION

Chrome derivatives are known to present antiallergic activity (U.S. 3,484,445) while coumarin and its derivatives have been used extensively in the prior art as perfume odors, and as a masking flavor.

BRIEF DESCRIPTION OF THE INVENTION

This invention involves new chemical compounds of the dihydrocoumarin and dihydrochromone series which are useful as intermediates in the synthesis of chromone and coumarin derivatives and as immuno-inflammatory agents.

In accordance with this inveniton there are provided compounds of the formula:

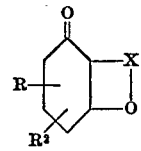

in which
X is the moiety

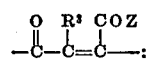

Z is a member selected from the group consisting of —$OR^4$,

—Cl, —Br, and —OM;
R, $R^2$, $R^3$, $R^4$ and $R^5$ are independently selected from the group consisting of —H, lower alkyl phenyl and benzyl,
$R^6$ is selected from the group consisting of —H, lower alkyl, phenyl, benzyl, lower dialkylaminoalkyl and cycloalkyl of 3 to 10 carbon atoms, and when taken with $R^5$ and the nitrogen atom to which they are bonded forms the morpholino, piperidino and piperazino groups, and
M is selected from the alkali metal cations and —$NH_4$.

The preferred group of compounds of this invention, from the standpoint of availability of precursors and process economics are:

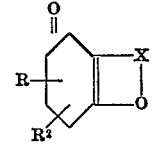

in which
X is

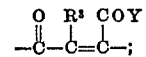

Z is a member selected from the group consisting of

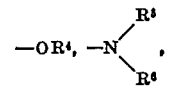

—Cl and —OM;
R, $R^2$, $R^3$, $R^4$, $R^5$ and $R^6$ are independently selected from the group consisting of —H and lower alkyl; and
M is selected from the group consisting of alkali metal and ammonium cations.

The substituents R and $R^2$ may appear in any of the three available ring positions of the cyclohexanone ring on one or two carbon atoms. By lower alkyl, applicants intend to embrace alkyl groups containing from one to nine carbon atoms, such as the methyl, ethyl, propyl, butyl, amyl, hexyl, heptyl, octyl and nonyl radicals as well as their branched chain analogues. The expression lower dialkylaminoalkyl is intended to embrace the lower alkyl groups both in terms of nitrogen substituents and the amino substituted alkyl group.

The 5,6,7,8-tetrahydro-2,5-dioxo-1-benzopyran derivatives of this invention are produced by the following general reaction scheme:

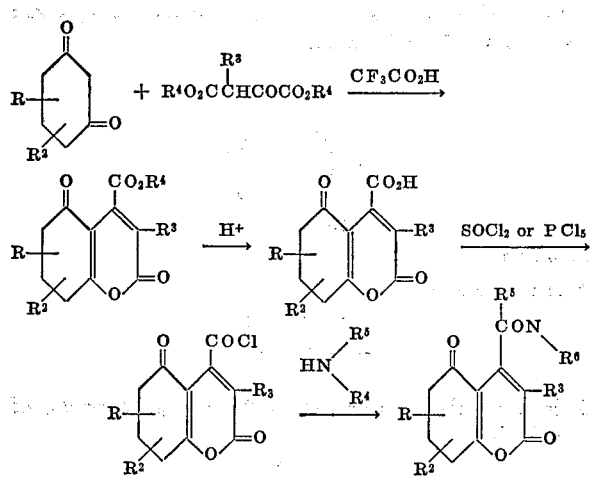

where R, $R^2$, $R^3$, $R^4$, $R^5$ and $R^6$ have the structure given above.

Similarly, the 5,6,7-tetrahydro-4,5-dioxo-1-benzopyran derivatives may be prepared by a modified Kostaneck-Robinson reaction as follows:

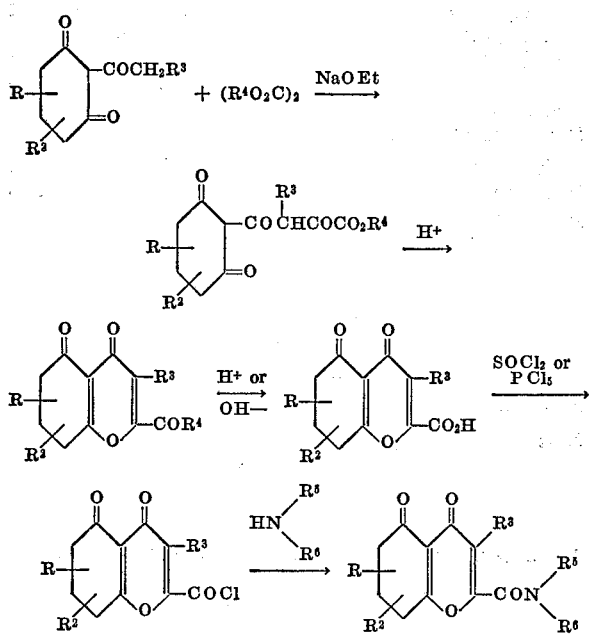

in which the R—$R^6$ groups have the character given *supra*.

In the preceding equations, the conversion of the free carboxylic acid to the amide is depicted to progress through the acid chloride. However, any acid activating agent may be employed to provide an intermediate for reaction with an amine in the preparation of the desired amide. For example, acid activating agents such as isobutylchloroformate, carbonyldiimidazole, dicyclohexylcarbodiimide, etc. provide intermediates by reaction with the carboxylic acid which are easily reacted with an amine to afford the desired amide. Furthermore, it is to be understood that any halogenating agent capable of converting the carboxylic acid to a carboxylic acid halide may be employed instead of the SOCl₂ or PCl₅ actually presented in the equation. For example, various carboxylic acid halides, sulfuryl-halides, PCl₃, PBr₃, etc. may be employed to produce the desired activated carboxylic acid intermediate.

The 5,6,7,8-tetrahydro-2,5 (and 4,5)-dioxo-1-benzopyran derivatives of this invention may be converted to known compounds of the chromone and coumarin series by known ring dehydrogenation techniques. In addition, the 5,6,7,8-tetrahydro-2,5 (and 4,5)-dioxo-1-benzopyran derivatives of this invention exhibit immuno-inflammatory activity and are useful as anti-allergic and anti-inflammatory agents. In that sense, the compounds of this invention inhibit the release and/or action of toxic products that arise from the combination of certain types of specific antigen-antibody reactions. Thus, the compounds of this invention may be directly formulated into pharmaceutical compositions comprising the hydrobenzopyran and a physiologically acceptable carrier or diluent. Depending upon the type of administration desired, i.e. oral, parenteral or inhalation, the carrier or diluent for the compounds of this invention are tailored. Thus, the carrier may be liquid, solid or a vapor appearing in major proportion, such as water, propellants such as chlorotrifluoroethane and dichlorodifluoroethane, and solid powders such as lactose, with a minor effective amount of the active ingredient. Generally, from about 0.05 up to about 10 percent weight/weight ratios of the hydrobenzopyran to diluent are suitable although a larger or smaller amount of the active ingredient may be used.

The following specific examples are presented for purposes of illustration and are not to be construed as limitations upon the true scope of the invention.

EXAMPLE 1

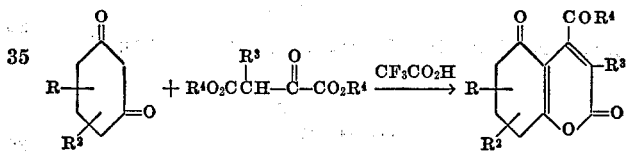

5,5-Dimethyl-1,3-cyclohexanedione (14.0 g., 0.1 mole) and sodium diethyl oxalacetate (21.0 g., 0.1 mole) are refluxed in trifluoroacetic acid (50 ml.) for 4 hours and the resulting mixture is kept at room temperature overnight. Most of the solvent is removed *in vacuo* at 60° C. and the residue is poured into an ether-water mixture. The ether fraction was washed consecutively with water, saturated aqueous sodium bicarbonate until basic, cold 0.5N NaOH, dilute acid, water and brine. The ethereal solution is then dried with magnesium sulfate and concentrated *in vacuo*, giving a white solid (7.4 g., 28 percent of theory) exhibiting a melting point of 133–137° C. (uncorrected). The solid is crystallized from ethyl acetate (30 ml.)-hexane (45 ml.), giving 5.6 grams of white crystals exhibiting a melting point of 136–138° C. (uncorrected); UV max. (95 percent ethanol) 263 mμ (ε 11,400), 296 mμ center of plateau (ε 6,530).

*Analysis.*—Calc'd for $C_{14}H_{16}O_5$: C, 63.63; H, 6.10. Found: C, 63.59; H, 6.01.

The product was ethyl 5,6,7,8-tetrahydro-7,7-dimethyl-2,5-dioxo-2H-1-benzopyran-4-carboxylate.

Example 2

5,6,7,8-Tetrahydro-7,7-dimethyl-2,5-dioxo-2H-1-benzopyran-4-carboxylic acid and salts The ethyl ester product of Example 1 (10.0 g., 0.038 mole) is refluxed in 100 ml. of 1:1 dioxane-20 percent aqueous hydrochloric acid for about 6 hours. After storing at room temperature overnight, 8.0 g. of a white solid, melting point 218–223° C. decomposition (uncorrected) is recovered. The solid is crystallized from absolute ethanol, giving 6.4 g. white crystals: m.p. 222–224° C. (decomposition); UV maximum (95 percent ethanol) 263 mμ (ε 11,100), 296 mμ inflection (ε 6,240).

*Analyis.*—Calc'd for $C_{12}H_{12}O_5$: C, 61.01; H, 5.12. Found: C, 60.78; H, 5.35.

The sodium salt is prepared by dissolving 2.1 g. of the free acid in boiling absolute ethanol (75 ml.), filtering, and adding 3.3 ml. of a 2.74 molar 1-butanol solution of sodium 2-ethylhexanoate. A white solid (1.3 g.) is filtered off and dried *in vacuo*. The product exhibited a melting point over 300° C.; UV maximum in 95 percent ethanol of 264 m$\mu$ ($\epsilon$ 9,940), 293 m$\mu$ inflection ($\epsilon$ 5,750).

*Analysis.*—Calc'd. for $C_{12}H_{11}NaO_5$: C, 55.82; H, 4.30. Found: C, 55.82; H, 4.40.

The ammonium salt is produced from the free acid by reaction with ammonia or ammonium hydroxide solution.

EXAMPLE 3

5,6,7,8-Tetrahydro-N,N7,7-tetramethyl-2,5-dioxo-2H-benzopyran-4-carboxamide 5,6,7,8-Tetrahydro - 7,7 - dimethyl - 2,5 - dioxo-2H-1-benzopyran-4-carboxylic acid (23.6 g., 0.1 mol) and thionyl chloride (7.9 ml., 0.11 mol) are refluxed in benzene (300 ml.) until evolution of hydrogen chloride ceases. The solution is concentrated *in vacuo* and the residue is dissolved in dichloromethane (100 ml.). A solution of dimethylamine (9 g., 0.2 mol) in dichloromethane (50 ml.) is added to the acid chloride solution at 0–10° C., and the mixture is stirred for about 4 hours. The solution is washed with water, sodium bicarbonate solution, brine, dried, and concentrated *in vacuo*, giving the title compound.

EXAMPLE 4

5,6,7,8-Tetrahydro-7,7-dimethyl-4,5-dioxo-4H-1-benzopyran-2-carboxylic acid ethyl ester Absolute ethanol (10.25 ml., 0.175 mol) is added to a mixture of 50 percent sodium hydride (6.24 g., 0.13 mol) in 250 ml. of toluene. A solution of 2-acetyl-5,5-dimethyl-1,3-cyclohexanedione (9.11 g., 0.05 mol) in diethyl oxalate (34 ml., 0.25 mol) is added to the toluene mixture at 10–20° C. over 20 minutes. The resulting mixture is stirred at 50° C. for about 3 hours, poured into 500 ml. of ice water, and the aqueous solution is washed twice with ether. The aqueous phase at 0–10° C. is acidified to pH 1 with concentrated hydrochloric acid in the presence of ether. The aqueous layer is extracted two more times with ether. The ether is washed with brine, dried with $MgSO_4$, and concentrated *in vacuo*, giving 16.1 g. of an amber oil. The oil is chromatographed on 160 g. of Florex AA–RVM 60/90 mesh in benzene. Two 500 ml. fractions of benzene followed by two 500 ml. fractions of chloroform are collected. The first chloroform fraction is concentrated, giving 1.5 g. (11 percent yield) of a white solid, m.p. 128–132° C., which is crystallized from a mixture of ethyl acetate and hexane; m.p. 134–137° C.; UV max. (95 percent EtOH) 221 m$\mu$ ($\epsilon$ 22,800), 248 m$\mu$ ($\epsilon$ 7,210).

*Analysis.*—Calc'd. for $C_{14}H_{16}O_5$: C, 63.63; H, 6.10. Found: C, 63.56; H, 6.05.

Concentration of the first benzene fraction gave 8.0 g. of a light yellow solid, m.p. 48–90° C. The solid is dissolved in 50 ml. of absolute ethanol, 3 ml. of ethanol saturated with gaseous hydrogen chloride is added, and the solution is refluxed for 20 min. After cooling in ice an additional 3.5 g. of light pink crystals of the title compound, m.p. 130–136° C., were collected.

EXAMPLE 5

5,6,7,8-Tetrahydro-7,7-dimethyl-4,5-dioxo-4H-1-benzopyran-2-carboxylic acid and sodium salt A solution of 20 g. (0.076 mol) of 5,6,7,8-tetrahydro-7,7 - dimethyl-4,5-dioxo-4H-1-benzopyran - 2 - carboxylic acid ethyl ester in 240 ml. of 1:1 dioxane-concentrated aqueous HCl is refluxed about 3 hours, and the solution kept at room temperature overnight. Water (250 ml.) is added, and the mixture cooled to 0–5° and filtered giving 11.7 g. of a white solid. Crystallization from acetonitrile gives 8.7 g. (47 percent) of white crystals: m.p. 210–212° C. dec.; UV max. (95 percent EtOH) 217.5 m$\mu$ ($\epsilon$ 24,800), 247 m$\mu$ ($\epsilon$ 8,830).

*Analysis.*—Calc'd. for $C_{12}H_{12}O_5$: C, 61.01; H, 5.12. Found: C, 60.97; H, 5.12.

To a boiling, filtered solution of 2.64 g. (0.010 mol) of 5,6,7,8-tetrahydro - 7,7 - dimethyl-4,5-dioxo-4H-1-benzopyran-2-carboxylic acid ethyl ester in 50 ml. absolute ethanol is added with stirring 1.9 ml. of 5.25 N sodium hydroxide over 1 min. Crystals formed rapidly and the mixture is kept on a steam bath for 10 minutes, cooled in ice, and filtered giving 1.7 g. (68 percent) of the salt as light buff crystals: m.p. over 300°; UV max. 95 percent ethanol ($\epsilon$ 27,900), 247 m$\mu$ ($\epsilon$ 9,840).

*Analysis.*—Calc'd. for $C_{12}H_{11}NaO_5$: C, 55.82; H, 4.30. Found: C, 55.65; H, 4.45.

EXAMPLE 6

5,6,7,8-Tetrahydro-N,N,7,7-dimethyl-4,5-dioxo-4H-1-benzopyran-2-carboxamide and acid halide 5,6,7,8-Tetrahydro - 7,7 - dimethyl - 4,5 - dioxo-4H-1-benzopyran-2-carboxylic acid (23.6 g., 0.1 mol) and thionyl chloride (7.9 ml. 0.11 mol) are refluxed in benzene (300 ml.) until evolution of hydrogen chloride ceases. The solution is concentrated *in vacuo* and the residue is dissolved in dichloromethane (100 ml.). A solution of dimethylamine (9 g., 0.2 mol) in dichloromethane (50 ml.) is added to the acid chloride solution at 0–10° C. and the mixture is stirred for about 4 hours. The solution is washed, sequentially with water, sodium bicarbonate solution and brine and is dried with $MgSO_4$ and concentrated *in vacuo*, giving the title compound.

What is claimed is:

1. A compound of the formula:

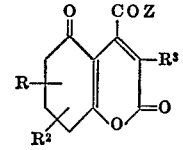

in which

Z is a member selected from the group consisting of —$OR^4$,

—Cl and OH;

R, $R^2$, $R^3$, $R^4$ and $R^6$ are independently selected from the group consisting of —H and lower alkyl; and M is selected from the group consisting of alkali metal and ammonium cations.

2. The compound of Claim 1 of the formula:

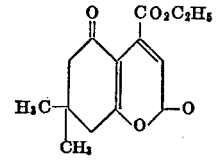

3. The compound of Claim 1 of the formula:

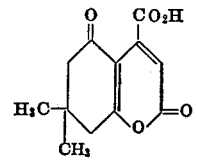

4. The compound of Claim 1 of the formula
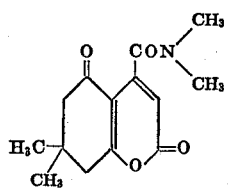
5. The compound of Claim 1 of the formula:
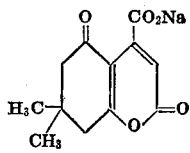
6. The compound
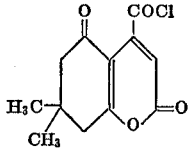
References Cited
UNITED STATES PATENTS
3,558,658   1/1971   McIntyre _____ 260—343.2
JOHN M. FORD, Primary Examiner
U.S. Cl. X.R.
260—345.2; 424—283